United States Patent [19]

Mnilk et al.

[11] 3,782,879
[45] Jan. 1, 1974

[54] MOLDING APPARATUS

[75] Inventors: Reinhold Mnilk, Dortmund-Wickede; Manfred Kurreck, Bochum-Weitmar; Ulrich Geltenpoth, Dortmund-Wickede, all of Germany

[73] Assignee: Holstein & Kappert Maschinenfabrik Phönix GmbH, Dortmund, Germany

[22] Filed: Sept. 13, 1971

[21] Appl. No.: 176,403

[30] Foreign Application Priority Data
June 9, 1971 Germany................P 21 28 561.0

[52] U.S. Cl................ 425/450, 425/389, 425/453, 425/DIG. 205
[51] Int. Cl.............................................. B29c 1/16
[58] Field of Search................... 425/450, 190–193, 425/453, 389, DIG. 205

[56] References Cited
UNITED STATES PATENTS
2,962,761   12/1960   Hobson............................... 425/450
3,479,696   11/1969   Balhouse............................ 425/129

Primary Examiner—Richard B. Lazarus
Attorney—Michael S. Striker

[57] ABSTRACT

A molding apparatus for thermoplastic material has a mold including two relatively movable mold sections. One or both of the mold sections are mounted on carriers for movement relative to the other, and adjusting means in form of springs or in form of superimposed fluid-tightly connected plates defining with one another a compartment which is extensible by pressure fluid, is interposed between at least one of the mold sections and its associated carrier so that the mold sections can be adjusted relative to one another and aligned in parallelism.

3 Claims, 2 Drawing Figures

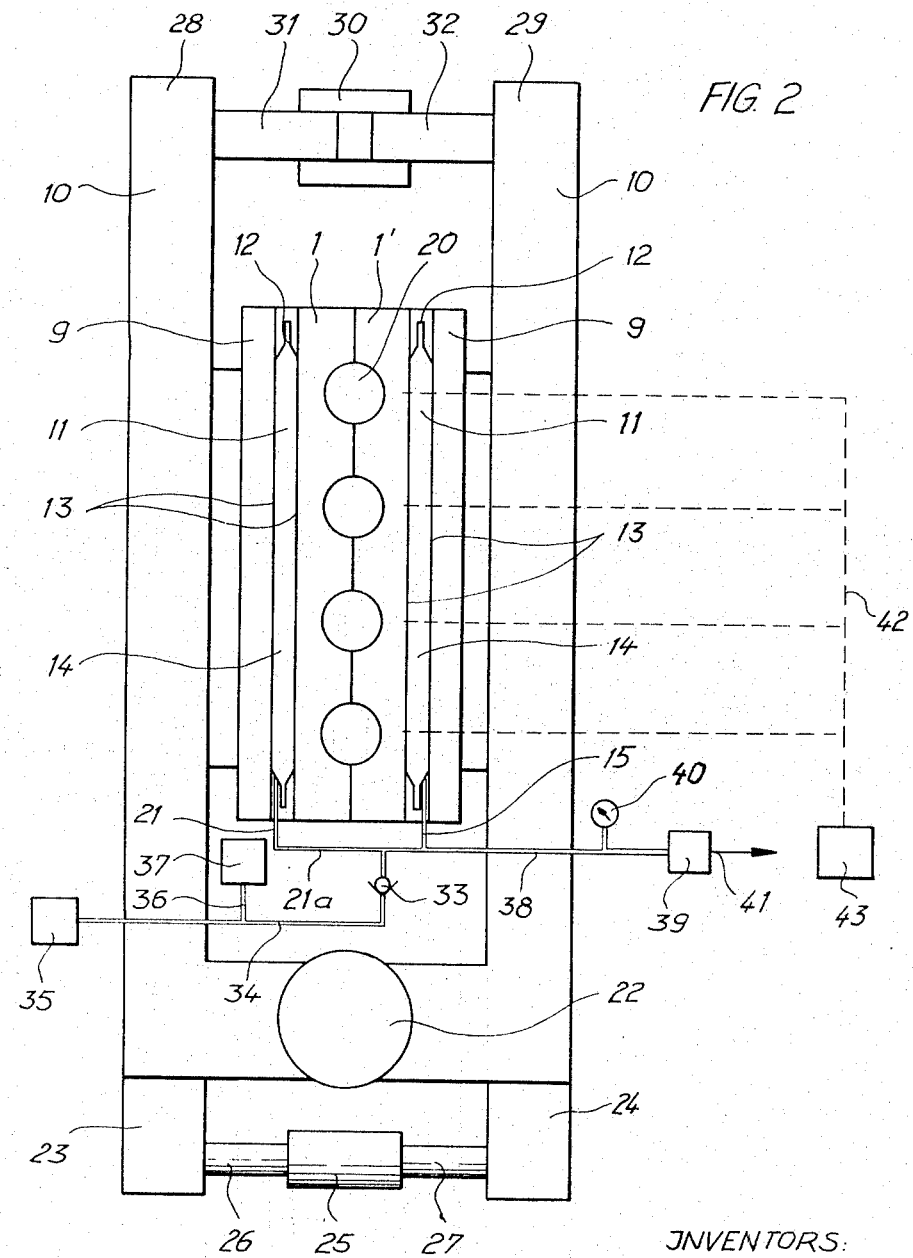

MOLDING APPARATUS

BACKGROUND OF THE INVENTION

The present invention relates generally to a molding apparatus and more particularly to an apparatus for molding of thermoplastic material. Still more particularly the invention relates to an apparatus for forming of hollow articles from thermoplastic material in a mold.

Apparatus of the type here in question is already known. Generally speaking, a tube of thermoplastic material is extruded from the extrusion head of an extruder and is then enclosed over a requisite portion of its length in a mold which is usually composed of two relatively movable mold sections. Thereupon the portion of the tube which is enclosed in the mold is expanded by admitting pressure fluid until it assumes the interior configuration of the mold cavity, whereby the finished article of thermoplastic material is obtained.

In these known apparatuses the mold sections must be moved relative to one another both in a sense opening and closing the mold—that is towards and away from one another—and in parallel planes. Even if the guidance elements for such molds are manufactured to close tolerances and properly support the relatively movable mold sections, it is a matter of experience that over a period of time difficulties will occur in these apparatuses in that the abutting surfaces of the two mold sections will eventually no longer be properly located in parallelism. Evidently, if under such conditions a portion of extruded thermoplastic tubing is to be formed in the mold cavity —or even if injection molding is to be carried out in such a mold—the resulting article will be provided with unattractive seams where the mold sections do not properly register, and such seams may under some circumstances even be functionally disadvantageous rather than being merely aesthetically displeasing. Moreover, when hollow articles are to be molded in this way with relatively thin walls, the stability of the wall—which latter becomes thinner because some of the thermoplastic mass is squeezed between the improperly aligned mold sections—is not as good as desired.

SUMMARY OF THE INVENTION

It is, accordingly, a general object of the present invention to overcome the disadvantages of the prior art.

More particularly it is an object of the present invention to provide an improved molding apparatus of the type under discussion which is not possessed of these disadvantages.

A further object of the invention is to provide such an improved molding apparatus in which the parallelism of the mold sections of a divided mold is always assured in a simple but reliable manner.

A concomitant object of the invention is to provide such an apparatus in which the moment at which the mold is properly closed and ready for the molding or forming operation can be reliably detected.

In pursuance of the above objects, and of others which will become apparent hereafter, one feature of the invention resides in a molding apparatus for thermoplastic material which, briefly stated, comprises mold means including two mold sections, and mounting means mounting at least one of these mold sections for movement relative to the other. Further, the apparatus according to the novel invention comprises adjusting means intermediate the mounting means and the one mold section for enabling adjustable parallel alignment of the mold sections.

In this construction any wear which may for instance occur over a period of time on the mounting means or the guide means for the mold sections, is compensated and proper alignment of the mold sections is always assured. Even if as a result of ceasing of one of the mold sections, or for other reasons, relative displacements of the mold sections should occur, the compensating or adjusting means is capable of effecting the necessary adjustment, particularly if both mold sections are provided with such adjusting means because in that case the adjusting means of the other non-affected mold section will carry out the necessary adjustment. This means that in all circumstances proper parallelism and tight closure of both mold sections relative to one another is assured, and that no material can be squeezed off the quantity of thermoplastic accommodated in the mold section, so that the development of flashes or seams in the finished product produced in the cavity of such a mold is completely or almost completely avoided.

It is advantageous if the adjusting means utilizes two flexible and distendable plate members which are superimposed and fluid-tightly connected along their respective circumferential margins, so that they define with one another a fluid-tight compartment into which pressure medium can be admitted to distend the plates which latter are located between the associated mold section and the mounting means therefor. In such a construction it is also advantageous to support and engage the outwardly directed surfaces of the plates with bolsters of suitable type.

The provision of bolsters assures that the plates are supported on both sides, that is on the respective outer sides, and any apertures which might for instance be provided in the mounting means or the mold sections contacting or facing the plates—for instance for mounting purposes—are closed by these bolsters so that the distendable flexible plates are supported over their entire surface areas in a manner which protects them against damage.

However, it is also possible to utilize suitable spring arrangements as the adjusting means.

It is also advantageous if at least one of the mold sections is connected to a mounting element having substantially U-shaped portions which engage behind angled portions provided on the carrier for the mold section. The juxtaposed faces of these portions and projections may have replaceable distancing members interposed between them, so that adjustments can be further made by replacing a distancing member of one thickness with a distancing member of another thickness. In this manner or mold sections can be replaced in any desired manner for mold sections of a different type, without having to make any changes to the mounting means itself. The mold sections can be simply withdrawn in this manner by disengaging the essentially hook-shaped interengaging portions of the mold section mounting element from the carrier, and the distancing members of course permit necessary adjustment so that initial inaccuracies in alignment during installation of the mold sections, or as a result of wear—for instance of the distancing elements—can be rapidly corrected by simply exchanging distancing elements which are worn for new ones, or exchanging distancing elements of one thickness for distancing elements of another thickness.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a somewhat diagrammatic top-plan view of a further embodiment of the invention.

DESCRIPTION OF THE PREFERRED EMBODIMENTS

Figure 1:
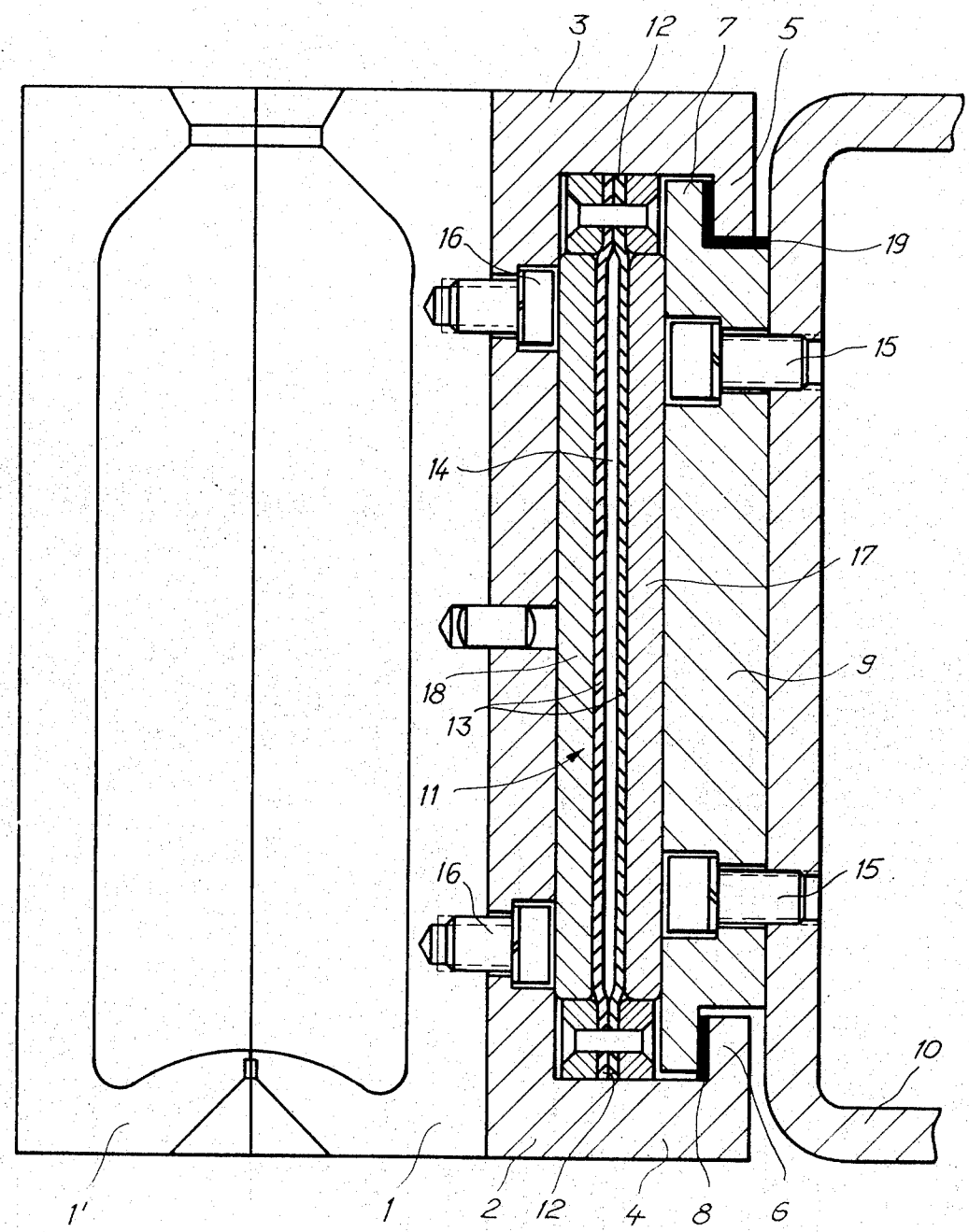
FIG. 1 is a cross-section through one embodiment of the invention.

Discussing the drawing in detail, and firstly directing attention to the embodiment disclosed with respect to FIG. 1, it will be seen that in this apparatus a form or mold is provided composed of two relatively movable mold sections 1, 1'. The mold section 1 is fixedly connected, as by bolting or the like, with a holder 2 having free portions 3 and 4 which are of substantially U-shaped configuration and have at their outer ends inwardly directed portions 5 and 6, respectively, behind which hook--shaped portions 7 and 8 of a mounting element 9 are engaged. The mounting element 9 in turn is removably connected to a pivoting arm 10.

According to the invention adjusting means 11 are interposed between the carrier 2 and the carrier or mounting element 9. In the embodiment of FIG. 1 the adjusting means 11 are in form of two superimposed flexible and distendable plates 13 which may consist of a suitable elastomeric material such as natural or synthetic rubber, or a synthetic plastic, and which are fluid-tightly connected with one another along their outer circumferential margins 12. They thus define with one another a compartment 14 into which a pressure medium—such as a pressurized fluid—can be admitted from a non-illustrated source and via a non-illustrated connection, both of which are known per se and will present no difficulties in understanding or identification for a person conversant with this art. The outer surfaces of the plates 13 are supported by bolsters or plate-shaped configuration which are identified with reference numerals 17 and 18, respectively, and which close the mounting bores 15 and 16.

Removable distancing members 19 are interposed between the portions 5 and 6 of the carrier 2 and the portions 7 and 8 of the mounting element 9.

It will be appreciated that when a pressure medium is admitted into the compartment 14, the portions 5 and 6 are tightly pressed against the cooperating portions 7 and 8, and that any displacements out of parallelism of the mold sections 1 and 1' relative to one another, are immediately compensated for by the plates 13 in that pressure medium is displaced—when this occurs from the compartment 14.

This embodiment, however, is to be considered only exemplary and it is emphasized again that it is possible to utilize compression springs or the like instead of the plates 13, and of course it is also possible to omit the carrier 2 and to have the portions 5 and 6 provided directly on the requisite mold section—here the section 1—for engagement with the portions 7 and 8. It will also be understood that although although only the mold section 1 has here been shown as being provided with the adjusting means 11, it is possible and in fact advantageous to make both of the mold sections 1, 1' movable—that is to mount them in the manner illustrated in FIG. 1 with respect to the mold section 1 alone—and to provide them both with the adjusting means 11.

When the mold sections 1 and 1' are in requisite position in which the mold cavity defined by them is closed, thermoplastic material accommodated in them, or rather in the mold cavity, can be expanded by admitting pressure fluid. Of course, this must be done only when the mold is tightly closed, and it is now of course desirable to determine in a simple and reliable manner the precise point in time at which the mold sections 1 and 1' tightly contact one another and close the mold cavity, and at which the closure pressure with which they engage one another is adequate to withstand the pressure build-up in the interior of the cavity which is required for effecting the necessary blow molding of the accommodated synthetic plastic material.

The present invention envisions utilization of the increase in pressure in the adjusting means to provide a signal indicative of the point in time at which the desired condition has been reached. In this manner closing of the mold must not be supervised by measuring instruments located exteriorly of the mold and which can become maladjusted or are subject to damage because they are located in necessarily unprotected positions so that they can be supervised by an operator. Furthermore, it is not necessary to install a separate device for supervising such proper closure and the attendant expenses—as well as the operator's responsibility for checking the indications of such a device can thereby be avoided.

An embodiment capable of affording the desired advantages is illustrated in FIG. 2, in which all those components identical with the embodiment of FIG. 1 are identified with the same reference numerals as in that Figure.

Keeping this in mind it will be seen that again the mold is composed of two relatively movable mold sections 1 and 1' which in this embodiment define with one another a plurality (four illustrated) of mold cavities 20 in each of which an article is to be formed by blow molding or blow-expansion of thermoplastic material. Of course, a single mold cavity, or fewer or more than four mold cavities, can also be provided. The mold sections are each connected with a mounting element 9 via adjusting means 11 of the same type as illustrated in FIG. 1, namely plates 13 which are superimposed and consist of elastically distendable material, being connected with one another in fluid-tight relationship along their circumferential margins 12. A connection 21 connects the compartment 14 defined between the plates 13 with a pressure-medium supply conduit 21a.

The mounting elements 9 are each rigidly connected with a pivotable arm 10 which can pivot about an axis 22 in the manner of a single-armed lever. A pressure medium motor 25, known per se, has output members 26 and 27 which are respectively connected with arms 23 and 24, each of which is in turn connected with one of the pivotable arms 10 so that the latter can be pivoted in this manner. The opposite free ends 28 and 29 of the arms 10 are each engaged by the output members 31 and 32 of an additional pressure-fluid motor 30.

A pressure-fluid supply conduit 34 is connected with the conduit 21a via a one-way valve 33 and is communication with a source of pressure fluid 35, for instance compressed air. A conduit 36 connects the conduit 34 with a pressure-limiting device 37 which is also known per se, and the conduit 21a is connected with a pressure-detecting conduit 38 in which a pressure-sensing device 39 of known construction and a measuring device 40 are interposed. An output 41 of the device 39 yields at requisite times a signal in response to detection of a certain pressure in the compartment 14, which is supplied to the diagrammatically illustrated forming device or molding head 43 which in turn is connected via the broken-line conduits 42 with the mold cavities 20 so that, when a signal is received from the device 39, the device 43 will admit pressure fluid into the cavities 20 to expand the thermoplastic material therein, for instance to expand tubular extrusions into the shape of thermoplastic bottles or the like.

When the device illustrated in FIG. 2 is in open condition, that is when the mold sections 1 and 1' are spaced from one another, the arms 10 and 10' will include an angle of approximately 45° with reference to one another. A non-illustrated extruder now extrudes into the space between the similarly remote mold sections 1 and 1' a number of tubular portions of thermoplastic material which corresponds to the number of mold cavities, that is in the illustrated embodiment four mold cavities 20. Subsequently the motor 25 is operated in a sense pivoting the arms 10 towards one another until they assume the position illustrated in FIG. 2. Towards the end of this closure movement the motor 30 acts via its output members 31 and 32 upon the free portions 28 and 29 of the arms 10 and thereby aids the closure movement of the mold. During this closure movement the mold sections 1 and 1' move towards one another until each of the mold cavities 20 accommodates one of the extruded tubular thermoplastic portions and the mold sections 1 and 1' tightly engage one another.

Because during the closure movement the motor 25 is still supplied with pressure fluid, pressure will develop in the chambers 14 because the mold sections 1 and 1' are floatingly mounted with respect to the carriers 9 via the adjusting means 11. As the pressure fluid accommodated in the compartments 14 is subjected to this further pressure, the mold sections 1 and 1' will not only contact one another in absolutely fluid-tight relationship, but the pressure in the connection 21, the conduit 21a and the conduit 38 also increases because a reduction of the pressure is impossible due to the presence of the one-way valve 33. This pressure increase is registered by the measuring device 40 and detected by the pressure-sensing device 39. Conventionally such known pressure-sensing devices can be adjusted, that is it is possible to select a desired pressure at which the device will then yield a signal. When, accordingly, such a pressure has been set and the device 39 detects that the pressure has been reached, it will yield a signal at its output 41 which signal may be electrical, pneumatic or mechanical, and which is supplied to the device 43 which is thereby activated for admitting pressure fluid via the conduits 42 into the mold cavities 20. This results in expansion and molding of the contents of the cavities, for instance to form plastic bottles. It is frequently the practice to fill and close the thus-molded bottles while they are still accommodated in the mold, whereupon the mold sections are then moved to open positions by activating the motor 25, so that the finished bottles, which may also be filled and closed as just pointed out, are removed.

The source 35 of pressure medium, as well as the conduit 34, serve to supply pressure medium in case of leakage or if in a particularly circumstance additional pressure medium should be required.

It will be understood that each of the elements described above, or two or more together, may also find a useful application in other types of constructions differing from the types described above.

While the invention has been illustrated and described as embodied in a molding apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features, that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. In a molding apparatus for thermoplastic material, a combination comprising mold means including two mold sections; mounting means mounting at least one of said mold sections for movement relative to the other, said one mold section having a side facing away from said other mold section and being provided with a mounting member which has a surace facing away from said side and is formed with a substantially T-shaped recess; adjusting means intermediate said mounting means and said one mold section for enabling adjustable parallel alignment of said mold sections, said adjusting means including a pair of elastically distendable juxtaposed plates having outwardly directed surfaces and respective circumferential margins in sealing engagement with one another, said plates defining with each other a fluid-tight compartment surrounded by said margins, and pressure means for pressurizing said compartment with pressure fluid to thereby distend said plates to a controlable extent; and bolster means engaging said outwardly directed surfaces wherein said plates and bolster means are mounted in said recess and said bolsters are interposed between said mounting member and said plates.

2. In a molding apparatus as defined in claim 1, said mounting means having angled projections; and further comprising a holding element carrying said one mold section and including substantially U-shaped angled portions each of which is in meshing engagement with one of said angled projections.

3. In a molding apparatus as defined in claim 2, said projections and meshing portions having respective juxtaposed faces; and further comprising replaceable distancing members interposed between said faces.

* * * * *